US012683333B2

(12) United States Patent
Panitz et al.

(10) Patent No.: US 12,683,333 B2
(45) Date of Patent: Jul. 14, 2026

(54) SHIELD CONTACT ELEMENT AND METHOD OF MANUFACTURING SUCH A SHIELD CONTACT ELEMENT

(71) Applicant: TE Connectivity Germany GmbH, Bensheim (DE)

(72) Inventors: Gregor Panitz, Bensheim (DE); Holger Starke, Bensheim (DE); Marco Wolf, Speyer (DE); Kevin Keil, Bensheim (DE); Luca Boehm, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 250 days.

(21) Appl. No.: 18/355,462

(22) Filed: Jul. 20, 2023

(65) Prior Publication Data

US 2024/0030656 A1 Jan. 25, 2024

(30) Foreign Application Priority Data

Jul. 21, 2022 (DE) ........................ 102022118309.2

(51) Int. Cl.
*H01R 13/6581* (2011.01)
*H01R 43/16* (2006.01)

(52) U.S. Cl.
CPC ......... *H01R 13/6581* (2013.01); *H01R 43/16* (2013.01)

(58) Field of Classification Search
CPC ........................... H01R 13/6581; H01R 43/16
USPC ..................................................... 439/607.58
See application file for complete search history.

(56) References Cited

U.S. PATENT DOCUMENTS 4,812,137 A 3/1989 Wilson et al.
11,177,586 B2 11/2021 Reinhardt
12,024,099 B2 7/2024 Kraemer
2004/0132341 A1* 7/2004 Noguchi ............ H01R 13/6582 439/607.56
2013/0203291 A1 8/2013 Sticker et al.
2017/0365956 A1* 12/2017 Campschroer ....... G02B 6/4292
(Continued)

FOREIGN PATENT DOCUMENTS

AT 406809 B * 9/2000 ........... H01R 24/525
CN 111244700 A 6/2020
DE 102017118278 A1 2/2019
(Continued)

OTHER PUBLICATIONS

Extended European Search Report dated Nov. 27, 2023, corresponding to Application 23186072.7-1201, 13 pages.
(Continued)

*Primary Examiner* — Abdullah A Riyami
(74) *Attorney, Agent, or Firm* — Barley Snyder

(57) ABSTRACT

A shield contact element for shielding a plug connection includes a housing shell and a contact lamella. The housing shell has a cylindrical shape and extends in an axial direction for receiving a plug connector, the plug connector connecting to a plug contact element to form the plug connection. The contact lamella extends in the axial direction and creates an electrical connection between the housing shell and a shield for shielding the plug contact element. The contact lamella has a contact foot disposed in a recess formed in the housing shell to electrically contact the housing shell with the shield in the recess.

20 Claims, 18 Drawing Sheets

(56) References Cited

U.S. PATENT DOCUMENTS

2018/0358718 A1 12/2018 Youtsey

FOREIGN PATENT DOCUMENTS

| | | | | | |
|---|---|---|---|---|---|
| DE | 102020132942 | B3 | | 5/2022 | |
| EP | 0052980 | A2 | | 6/1982 | |
| EP | 0362598 | A2 | | 4/1990 | |
| EP | 2200130 | A1 | * | 6/2010 | ......... H01R 13/5221 |
| EP | 2843774 | A1 | | 3/2015 | |
| EP | 2843774 | B1 | * | 5/2016 | ............. H01R 43/16 |
| EP | 3641071 | A1 | | 4/2020 | |
| EP | 3859906 | A1 | * | 8/2021 | ......... H01R 13/6583 |
| EP | 3915172 | B1 | | 6/2025 | |
| JP | 362598 | A | * | 4/1990 | ........... H01R 13/648 |
| JP | H0298075 | A | | 4/1990 | |
| JP | 2017069026 | A | | 4/2017 | |
| WO | 2014108197 | A1 | | 7/2014 | |
| WO | WO-2014108171 | A1 | * | 7/2014 | ......... H01R 13/6582 |
| WO | WO-2021228294 | A1 | * | 11/2021 | ......... H01R 13/5202 |

OTHER PUBLICATIONS

Korean Office Action dated Oct. 14, 2024 with English translation, corresponding to Application No. 10-2023-0094835, 11 pages.

Japanese Office Action dated Aug. 27, 2024 with English translation, corresponding to Application No. 2023-116461, 5 pages.

Office Action from the Deutsches Patent—und Markenamt dated Mar. 6, 2023, corresponding to Application No. 10 2022 118 309.2, 113 pages.

European Patent Office Examination Report dated Nov. 28, 2025, corresponding to Application No. 23 186 072.7 1-1201, 12 pages.

Indian Examination Report dated Jun. 3, 2026, corresponding to Application No. 202344047904, 8 pages.

* cited by examiner

SHIELD CONTACT ELEMENT AND METHOD OF MANUFACTURING SUCH A SHIELD CONTACT ELEMENT

CROSS-REFERENCE TO RELATED APPLICATIONS

This application claims the benefit of the filing date under 35 U.S.C. § 119(a)-(d) of German Patent Application No. 102022118309.2, filed on Jul. 21, 2022.

FIELD OF THE INVENTION

The present invention relates to a shield contact element and a method of manufacturing such a shield contact element.

BACKGROUND

The shielding of electro technical devices serves to keep fields away from the devices. These fields occur in particular at higher frequencies and are electric and/or magnetic fields. In the case of high-voltage (HV) cables in particular, it may be necessary to protect the surroundings from the fields emitted by the cable.

Shield contact elements are used, for example, in HV cables for electric or hybrid vehicles. In such HV cables, shielding may be required to keep the other on-board electronics, which operate in the low-voltage range (e.g. 12 or 24 volts), free from interference due to the HV voltages used, for example in the range from about 300 volts to 800 volts.

For this purpose, it is necessary to guide the shielding of the cable also at a plug connector in such a way that an effective shielding and/or a grounding takes place between a plug and a plug contact element, for example a socket, a header, a cable or an element of the customer, also called customer unit or customer contact element. For this purpose, it is necessary to loop through this shielding during the connection of plug and plug contact element, by a plugging process, by a shield contact element. Here, grounding means in particular that an optimal path is provided for the current, for example by providing few obstacles, i.e. many contact points, these contact points have low resistances and thus enable a low overall resistance. In particular, grounding means providing an optimal path for the current, by using many contact points, i.e., a parallel connection, with low resistance along the entire connector system, for example, from cable to customer unit, to enable low overall resistance. This provides optimum grounding for the current.

For example, as shown in FIG. 29, a shield contact element is bent from a metal sheet to create a cylindrical body to receive the plug connector. A plurality of contact lamellae 1120 are used to connect the shield contact element to a shield of an HV cable, which is not shown. In the shield contact element, the contact lamellae 1120 are created by stamping the sheet shown in FIG. 30, with a gap between adjacent contact lamellae 1120.

However, with this known shield contact element, there is a risk that, due to the gaps between the contact lamellae 1120, the shielding is not sufficient, because the gaps between the contact lamellae 1120 cannot shield. However, the gaps cannot be avoided, otherwise at least the flexibility cannot be guaranteed. It is also difficult to manufacture without gaps. For example, a gapless arrangement of the contact lamellae 1120 leads to abrasion, which contaminates the plug connector.

Furthermore, another shield contact element has the problem that it must be constructed in two parts, as shown in FIG. 31. This leads to complex assembly.

Furthermore, another shield contact element has the problem that it has bent contact lamellae 2120, as shown in FIG. 32, which protrude from the housing shell. Thus, a shield not shown, which is applied to the contact lamellae 2120, can only be provided at a distance from the housing shell. This creates a gap that has a large effect on shielding. In general, to compensate for the shielding loss effects of the gap, the ratio of gap to axial overlap must usually be 1 to 5. In other words, a gap of 1 mm requires a 5 mm long overlap to produce sufficient shielding. However, such a long shielding in the axial direction can be problematic with respect to the limited installation space.

Another problem with the solution shown in FIG. 32 is that the grounding path is extended via the U-shaped bent contact lamellae, in particular a conduction path is formed which is U-shaped, i.e. axially forward and backward. This leads to eddy currents, which degrade the shielding.

SUMMARY

A shield contact element for shielding a plug connection includes a housing shell and a contact lamella. The housing shell has a cylindrical shape and extends in an axial direction for receiving a plug connector, the plug connector connecting to a plug contact element to form the plug connection. The contact lamella extends in the axial direction and creates an electrical connection between the housing shell and a shield for shielding the plug contact element. The contact lamella has a contact foot disposed in a recess formed in the housing shell to electrically contact the housing shell with the shield in the recess.

BRIEF DESCRIPTION OF THE DRAWINGS

The invention will be described in more detail in the following with reference to exemplary embodiments illustrated in the drawings, in which.

DETAILED DESCRIPTION OF THE EMBODIMENT(S)

For a better understanding of the present invention, it will be explained in more detail with reference to the examples of embodiments shown in the figures. In this context, identical parts are provided with identical reference signs and identical component designations. Furthermore, some features or combinations of features from the different embodiments shown and described may also represent independent, inventive solutions or solutions according to the invention.

Figure 1:
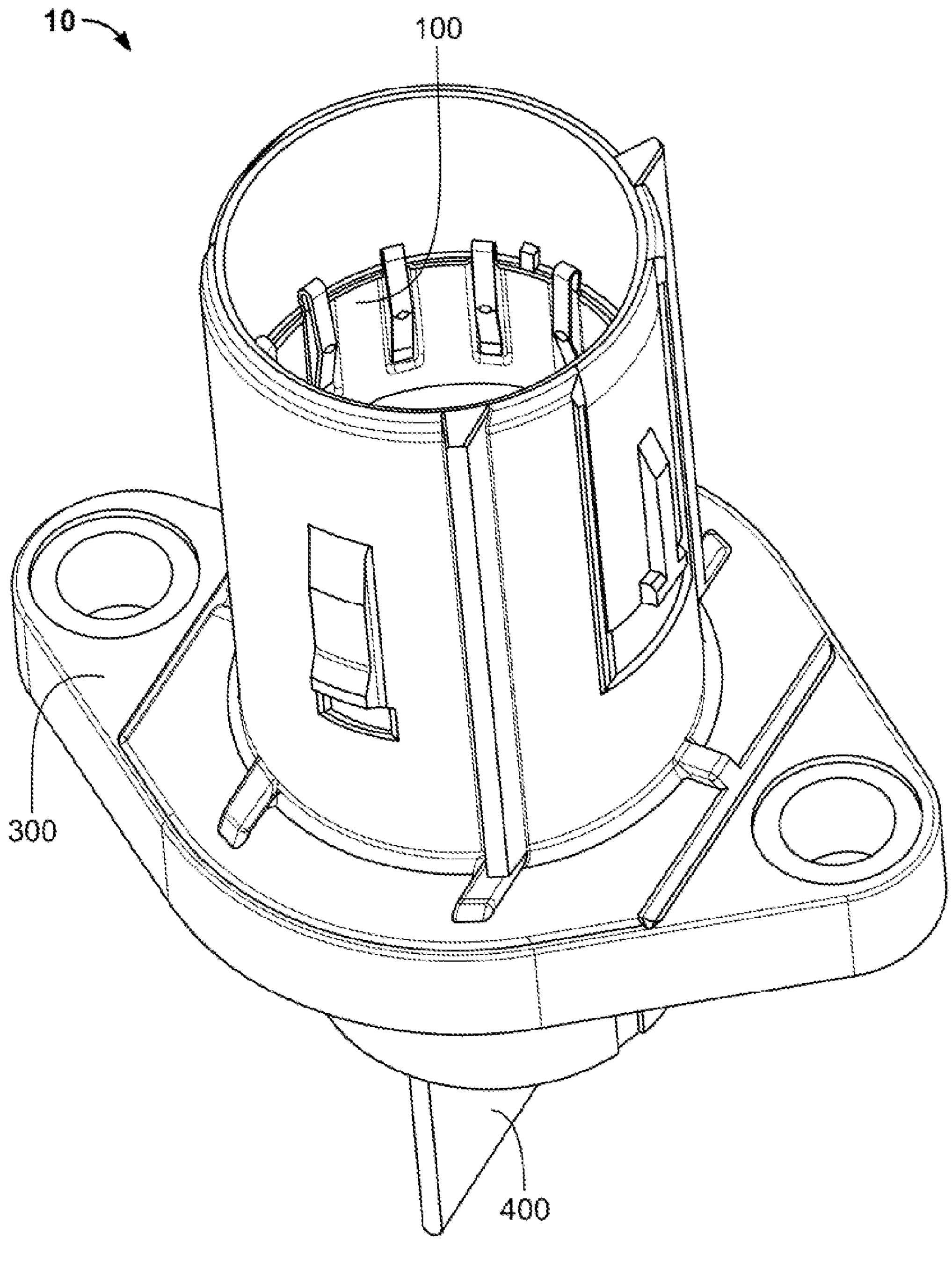
FIG. 1 is a perspective view of a shield contact system.

The present invention will now be described with reference to the figures. FIG. 1 shows an example of a shield contact system 10 of the socket. Thus, one half of a system is shown which comprises, for example, the shield contact system 10 of the socket which can be contacted with a counterpart. The shield contact system includes a shield contact element 100 for shielding a plug and a shield contact housing 300 for holding the shield contact element 100. A housing 400 of the plug connector, shown in FIG. 1, holds the plug. The shield contact element 100 may include or comprise a conductive material, in particular a metal. The shield contact housing 300 and the housing 400 may contain or consist of an insulating material, in particular a plastic.

Figure 2:
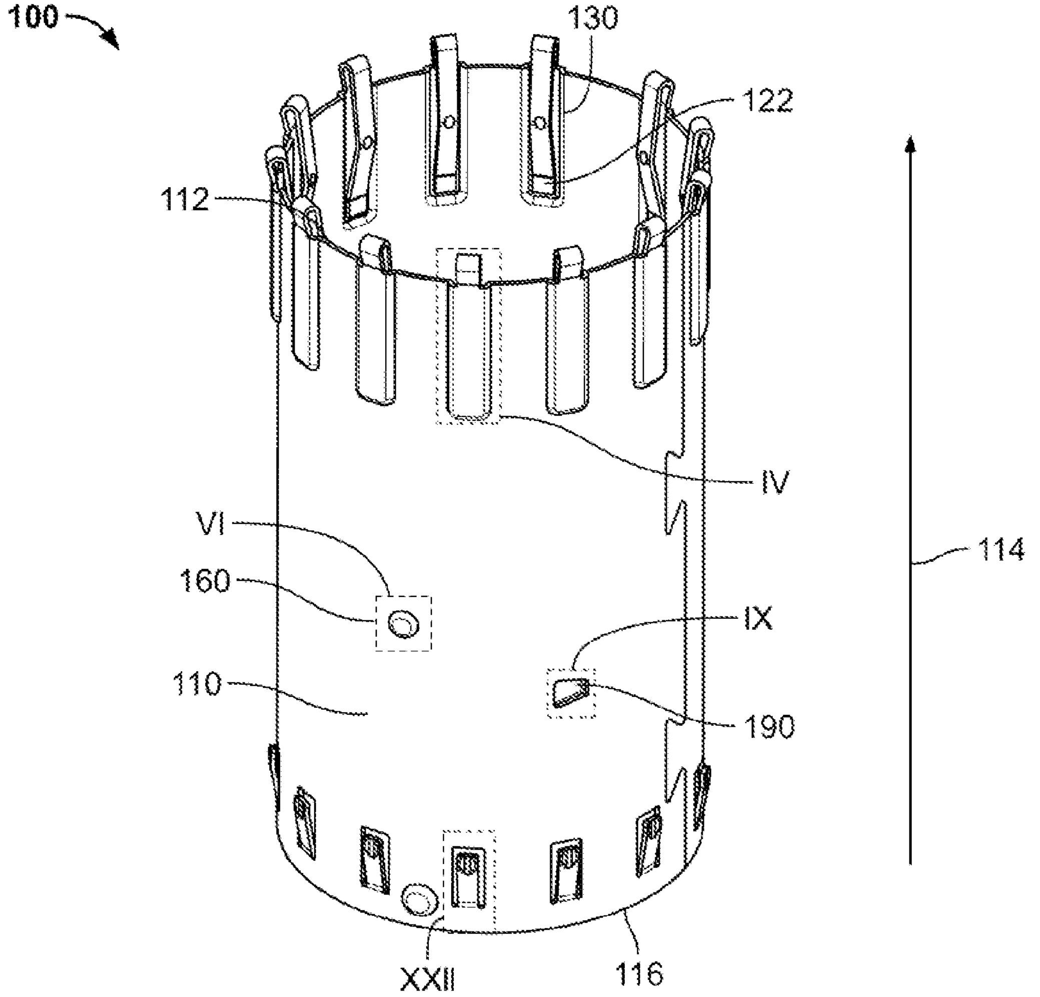
FIG. 2 is a perspective view of a shield contact element.

FIG. 2 shows an example of a shield contact element 100. The shield contact element 100 comprises a cylindrical housing shell 110 extending in the axial direction 114 for receiving a plug connector. Here, a cylinder is understood to be a geometric body in which two parallel, planar, congruent, base surfaces are connected to each other by a shell, which is also referred to here as a housing shell. The base surface is, for example, circular, elliptical or polygonal, in particular rectangular. The axial direction 114 corresponds to the mating direction of the plug connector.

In this context, a plug connector is understood to be an element that serves to separate and connect electrical lines. Positive locking, also referred to as a form-fit connection, of the plug parts aligns the connecting parts appropriately, in particular. The interlocking of at least two connection partners creates positive-locking connections. As a result, the connecting partners cannot become detached even without or in the event of interrupted force transmission. In other words, in the positive locking connection, one connection partner is in the way of the other.

By plugging, a plug contact element is connected to realize the plug connection. In the axial direction, the housing shell 110 has a first end 112 and an opposite second different end 116. For example, the plug contact element is used to attach a high-voltage cable or a recess in a customer contact element, for example a control apparatus made of metal or a customer unit, to which the shielding is transferred or forwarded.

Figure 3:
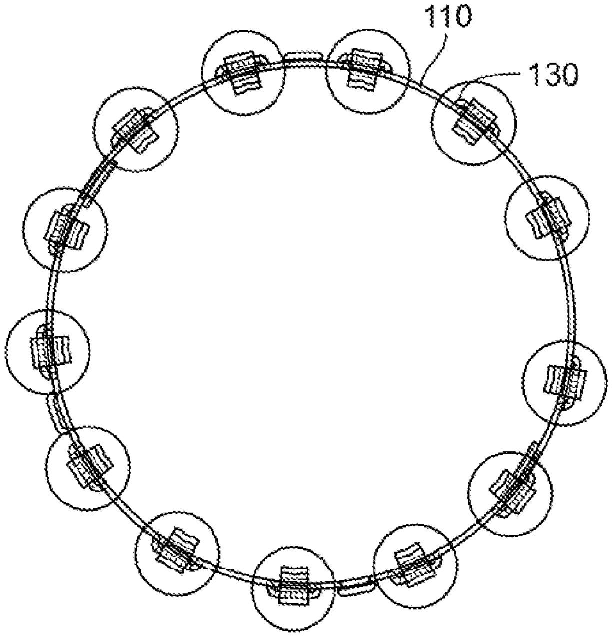
FIG. 3 is a top view of the shield contact element according to FIG. 2.

Furthermore, the shield contact element 100 comprises in total a plurality of contact lamellae, in this case for example thirteen, extending in the axial direction 114. FIG. 3, a top view of the shield contact element of FIG. 2, shows that the plurality of contact lamellae are evenly distributed. It is understood that one contact lamella is sufficient to create an electrical connection between the housing shell 110 and the shield for shielding the plug contact element. As used herein, a contact lamella (herein also referred to as a lamella), is a platelet that may be located in a structure of similarly arranged, often parallel, lamellae. A lamella is a small, flat object. The contact lamella is therefore smaller than the housing shell 110. As used herein, shielding is understood to protect, for example, electro technical equipment from electrical and/or magnetic fields occurring in particular at higher frequencies. Furthermore, the contact lamella is used to allow undesired shield currents to run to ground via the shortest possible path by means of optimum contacting. Therefore, the number of contact lamellae and the size of the contact resistance are relevant.

Thus, it results that the housing shell and the shield serve to shield a connector system, i.e., plug connector and header/socket, or to shield an assembly, i.e., a connector system and a cable.

Such a housing shell can serve to accommodate a plug connector, for example a high-voltage plug connector. The plug connector serves, for example, to connect devices, for example a battery and a motor, via the plug connector by means of a plug contact element, for example a cable, a high-voltage cable of a customer contact element, a header or a socket. In particular, the shield contact element may comprise such a plug connector.

Furthermore, the shield contact element 100 comprises the contact lamella, which enables the housing shell 110 to be connected to the shield of the plug contact element, for example of the HV cable, for shielding the plug in the axial direction. Thus, an electrical connection can be made from the shield of the plug contact element, for example of the HV cable, to the housing shell 110, which is necessary for shielding. Herein, connectors may be, for example, a plug or a header. The plug contact element may be, for example, the counterpart of plug or header. Furthermore, the plug contact element can also be a cable or a customer unit. Thus, the plug can be connected to the plug contact element. In this step, the shield of the plug is also connected to the shield of the plug contact element.

In other words, the shield of the plug contact element, for example the HV cable, is connected to the shield of the plug also referred to as the shield of the plug. Furthermore, the shield can be connected to shield of a header, also referred to as a socket. The shield of the header is connected to the customer unit. Thus, a current path is created on the shield, from the cable to the customer unit. Thus, many contacts with low resistances are required between the components. These contacts are used for optimal grounding for the connector system. The above contact lamella reduced little radiation because shield currents can flow away quickly. In particular, the contact lamella includes contact feet.

A space is provided between adjacent contact lamellae. For example, the plurality of contact lamellae is manufactured by punching by shearing off the area between the contact lamellae. Further, a spacing between adjacent contact lamellae creates that adjacent contact lamellae have no friction surface and thus cleanliness is increased as there is less abrasion from particles. A plurality of contact lamellae is advantageous for interconnection properties and shielding.

In addition, a large number of contact lamellae is advantageous for the mechanical and electrical connection properties, i.e. for the current path, and the shielding. The number of contact lamellae allows the normal force due to sliding friction of the lamellae on the contact partner to be dimensioned. Contact transfer resistances, which should be low for an optimal current path, depend on the electrical material properties and the (mechanical) normal force. Furthermore, the mating force may be limited, for example, by the fact that it must be suitable for manual assembly or must be dimensioned to prevent wear of the surfaces.

Further, FIGS. 2 and 3 in particular show that a first contact foot 122 of the contact lamella is disposed in a recess 130 formed in the housing shell 110. As described above, here the recess 130 is a bulge formed perpendicular to the axis 114. Thus, in the recess 130, the first contact foot 122 of the contact lamella can electrically contact the housing shell 110. The shield can then be contacted via the contact lamella. It should be taken into account that in the non-contacted state, the first contact foot 122 does not necessarily have to be in contact with the housing shell 110. It may be provided that the first contact foot 122 is permanently detachably or non-detachably connected to the housing shell 110.

Figure 4:
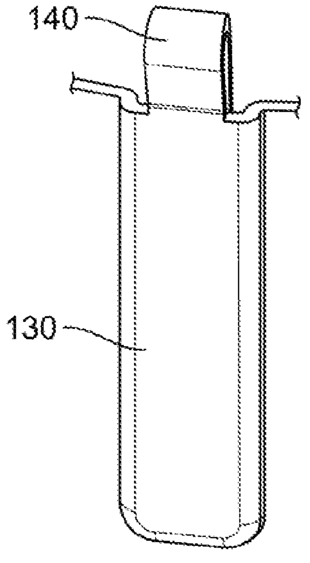
FIG. 4 is a detailed view of element IV of the shield contact element from FIG. 2.
Figure 5:
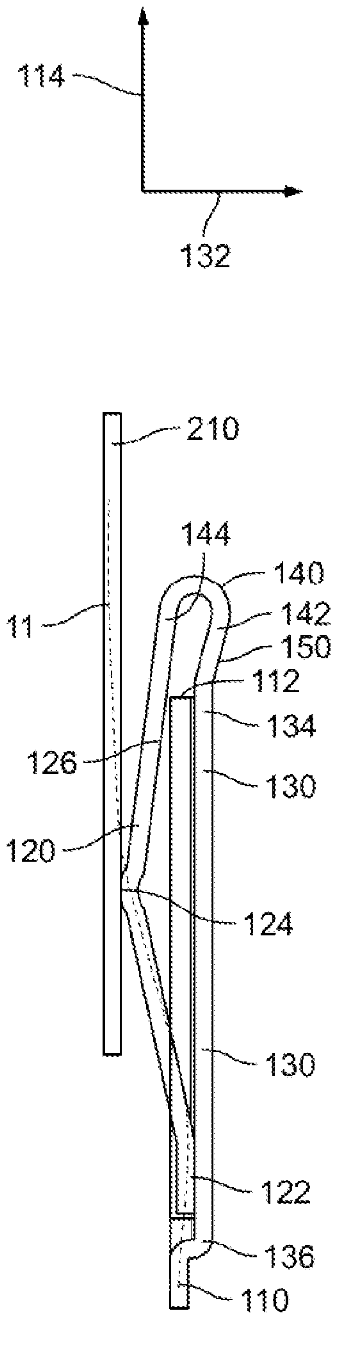
FIG. 5 is a sectional view of FIG. 4 and further details.

Further details of the contact lamella can be seen in FIG. 4, a detailed view, of a recess 130 and the contact lamella 120 of the shield contact element 100 of FIG. 2, and FIG. 5, a sectional view of FIG. 4 showing further details. A spring is a usually metallic technical component that can be deformed sufficiently elastically in practical use. The elastic deformation of springs is usually bending or torsion. Thus, the contact lamella 120 enables a positive and/or force locking connection.

For example, as shown in FIG. 5, a recess 130 is formed in the housing shell 110. In particular, the recess 130 is formed in the direction 132 perpendicular to the axial direction 114 in which the housing shell 110 extends.

The recess 130 may extend from one axial end of the cylindrical housing shell 110 in the axial direction to the other end of the housing shell 110. The cylindrical housing shell has two ends, namely the edges between the base and the shell of the cylinder. The arrangement of the recess 130 at one end leads to optimum utilization of the installation space and easy handling for plugging. In particular, the recess 130 can extend only to a central region of the housing shell 110.

As used herein, recess 130 means a hollow body open on one side. The recess 130 can be obtained, for example, by deep-drawing a sheet. The sheet is then bent to form the cylindrical housing shell 110. The recess 130 causes the housing shell to form a continuous shield in the area of the contact lamella.

For example, as shown in FIG. 5, the recess 130 extends from one axial end 112 of the cylindrical housing shell in the axial direction 114 toward the other end (reference numeral 116 in FIG. 2) of the housing shell 110. In particular, the recess 130 has a first axial end 134 and a second axial end 136, the second axial end 136 being located between the axial ends 114, 116 of the housing shell 110.

The recess 130 can be either a projection or an indentation formed by the housing shell 110 perpendicular to the mating direction. The recess 130, i.e. the hollow body open on one side, is thus in particular open to an interior space formed by the housing shell 110 to accommodate the plug connector, and forms with the housing shell 110 a closed surface in the area of the contact lamella to the surroundings, which is to be shielded by the housing shell 110.

The recess 130 allows the contact foot 122 in the recess 130 to make electrical contact between the housing shell 110 and the shield. Because the recess 130 is formed from the housing shell 110, the housing shell 110 with the recess compensates for gaps between the contact lamellae 120. In particular, the housing shell 110 and recess 130 are formed in one piece from a sheet, for example by deep drawing.

The fact that the recess 130 is a projection or indentation perpendicular to the mating direction, i.e. it is formed in the radial direction, reduces a gap between the shield and the shield contact element 100. This can save installation space and/or improve shielding. With the same radial installation space in diameter compared to comparable solutions without a recess, the overlap behind the lamella 120 allows it to be designed axially longer without loss of shielding effect. At the same time, the axial length of the shield can remain substantially the same. This applies in particular to a contact lamella bent by 180°. In comparable solutions without a recess for a contact lamella bent by 180°, for example, the length of the lamellae is always also part of the length of the shield. The comparable solutions without a recess for a contact lamella bent by 180°, for example, therefore require more installation space.

In an embodiment, the housing shell 110 has a diameter of approx. 10 mm to 50 mm. At the same time or alternatively, the recess 130 projects 0.5 mm to 2 mm perpendicular to the mating direction.

Elements are further provided at the axial end 112 of the cylindrical housing shell 110 to fix the contact foot 122 of the contact lamella 120 to the housing shell 110. Alternatively, according to an example not shown, the contact foot 122 and the housing shell 110 may be of a two-piece design, or the contact foot 122 may be fixed to any portion of the housing shell 110.

Here, the elements may include an offset piece 150 disposed at the axial end 112, as shown in FIG. 5. Further, the elements may comprise a U-shaped connector 140. In particular, the U-shaped connector 140 comprises two legs 142, 144 for fixing the contact lamella 120 to the housing shell 110 via the offset piece 150. In particular, the offset piece 150 is provided to offset the U-shaped connector 140 in the direction 132 of the recess 130. This allows the bending radius of the U-shaped connector 140 to be optimized so as to save installation space. The U-shaped connector 140 is used here in particular so that the contact lamella 120 and the housing shell 110 can be designed as a single piece.

In an embodiment, the contact lamella 120 is formed in one piece on the housing shell 110, which means that both parts are made, for example, from one piece or from inseparable parts. Such a one-piece design simplifies the handling of the shielding element. Such a shield element can be produced particularly easily if the first contact foot is arranged in the recess by bending the U-shaped connector. The U-shaped connector 140 and the housing shell 110 engage in the same area of the base. This allows the U-shaped connector 140 to be bent in only one direction to allow the contact foot to be located in the recess, simplifying fabrication.

Furthermore, to save installation space, it is provided that the offset piece 150 is connected in the recess 130 at the axial end 112 of the housing shell. In other words, the leg 142 is connected here to the axial end 134 of the recess 130 via the offset piece 150. This allows the U-shaped connector 140 to be offset in the direction of the recess 130. Such an offset piece 150 enables the bending radii to be optimized and particularly little installation space is required. In an embodiment, the U-shaped connector 140, the offset piece 150, the contact lamella 120, and the housing shell 110 are all in one piece.

The second leg 144 of the U-shaped connector 140 holds the contact lamella 120. In particular, the U-shaped connector 140 may be formed by bending a sheet of metal. The legs 142, 144 are opposite each other. The middle portion, for example the bent portion, connects the opposing legs.

Furthermore, it can be seen from FIG. 5 that the contact lamella 120 can be attached to the U-shaped connector 140, wherein the contact lamella 120 can comprise the first contact foot 122, a second contact foot 124 and a third contact foot 126. The second contact foot 124, which is located here between the first and third contact feet, protrudes from the housing shell 110 opposite the direction 132 of the recess 130. Thus, the second contact foot 124 serves for positive connection to a shield 210. The embodiment shown here has the advantage that the first contact foot 122 is protected during mating. However, the second contact foot 124 may also be located at an axial end of the contact lamella 120, according to an example not shown.

By plugging the plug connector, the second contact foot 124 is pressed in the direction of the first contact foot 122 and a mechanical and electrical connection of the shield and the housing shell 110 occurs. In other words, the contact lamella 120 is a spring element, as for example one of the contact feet 122, 124 is directly or indirectly connected to the housing shell 110.

As FIG. 5 shows, the third contact foot 126 can be arranged in the recess 130, for example at the axial end. This allows the second contact foot 124 to be pressed against the shield particularly efficiently.

The dashed line 11 in FIG. 5 shows how the current path, also referred to as the conduction path, extends between the shield 210 and the housing shell 110. In particular, the placement of the first contact foot 122 in the recess 130 allows the current path 11 to be free of turbulences. In other words, the conduction path, for example to ground the shield, does not have to pass over the elements 140, 150 to contact the shield 210 with the housing shell 110. Thus, the overall resistance is lower and the shielding characteristics are improved.

The contact lamella 120 thus rests with two points either on the shield or on the housing shell. Particularly advantageous is when the first contact foot 122 and the third contact foot 126 are arranged in the recess 130 and the second contact foot 124 is adapted to press against the shield. In other examples, the second contact foot 124 may be disposed between the first and third contact feet 122, 126. Thus, the ends of the contact lamella 120 are protected in the recess 130. Thus, during mating, the gap at the base of the contact lamella 120 is closed, thereby increasing the normal forces because this creates a triangle of forces on both legs of a bending beam. The third contact foot 126 point thus enables a higher normal force and a second electrical current path, both of which lower the contact resistance.

Figure 29:
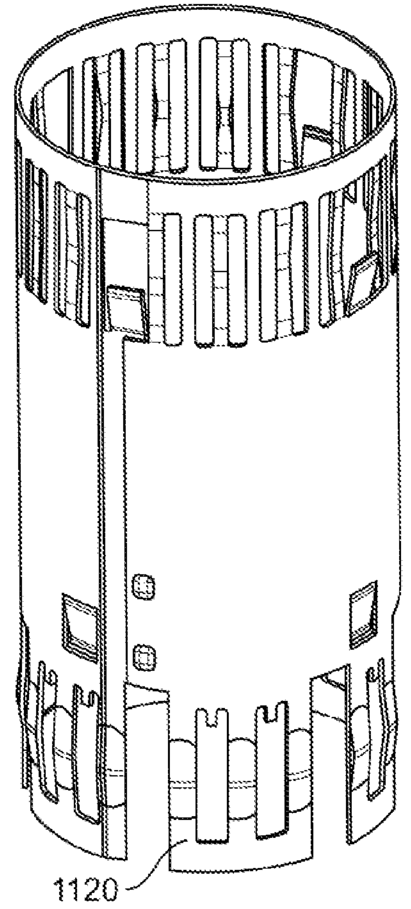
FIG. 29 is a perspective view of a shield contact element with gaps according to the prior art.
Figure 30:
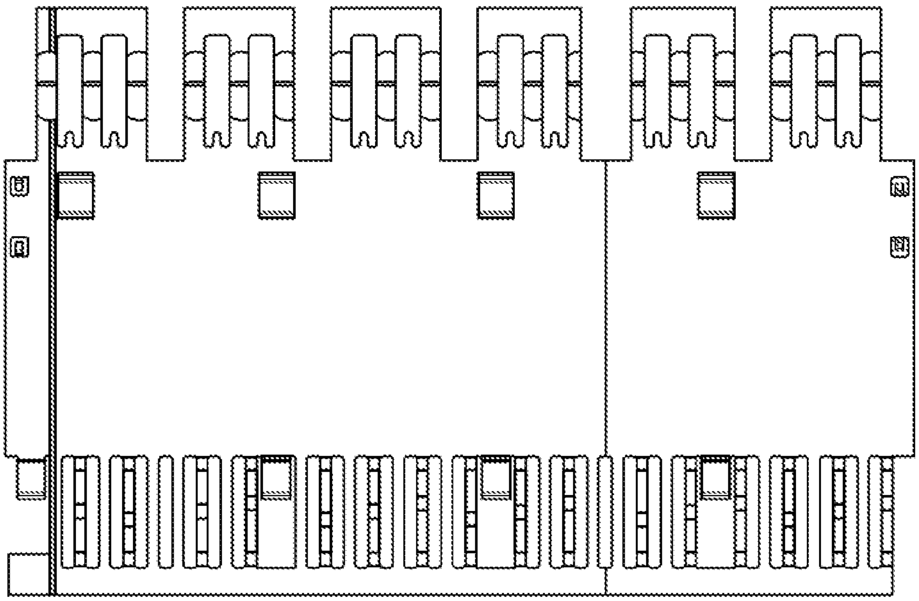
FIG. 30 is a plan view of a sheet for a shield contact element according to FIG. 28.
Figure 31:
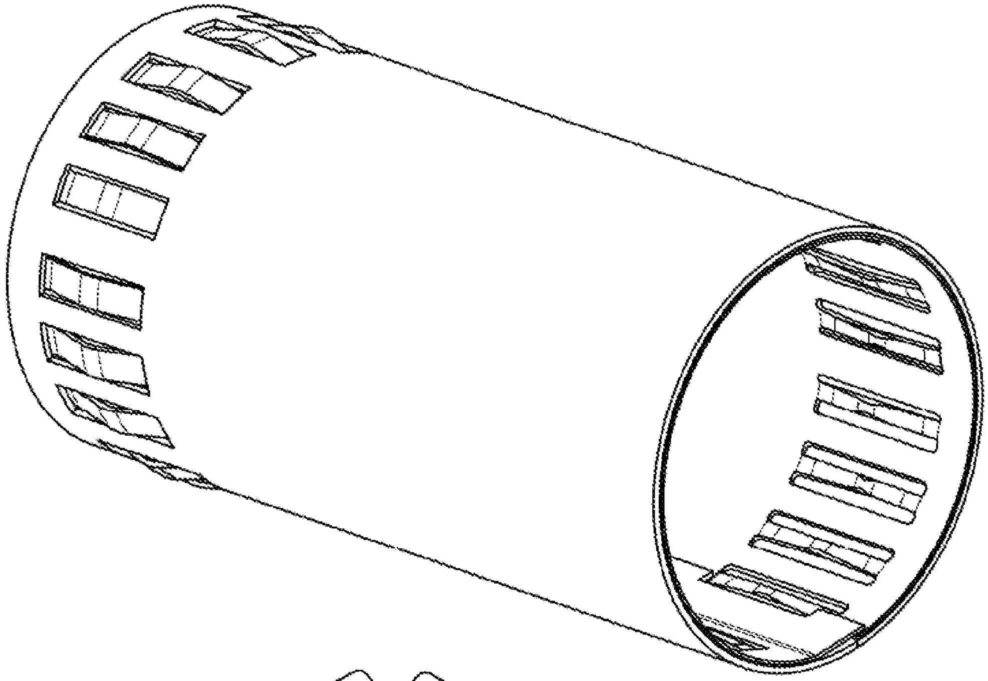
FIG. 31 is a perspective view of a two-part shield contact element according to the prior art.
Figure 32:
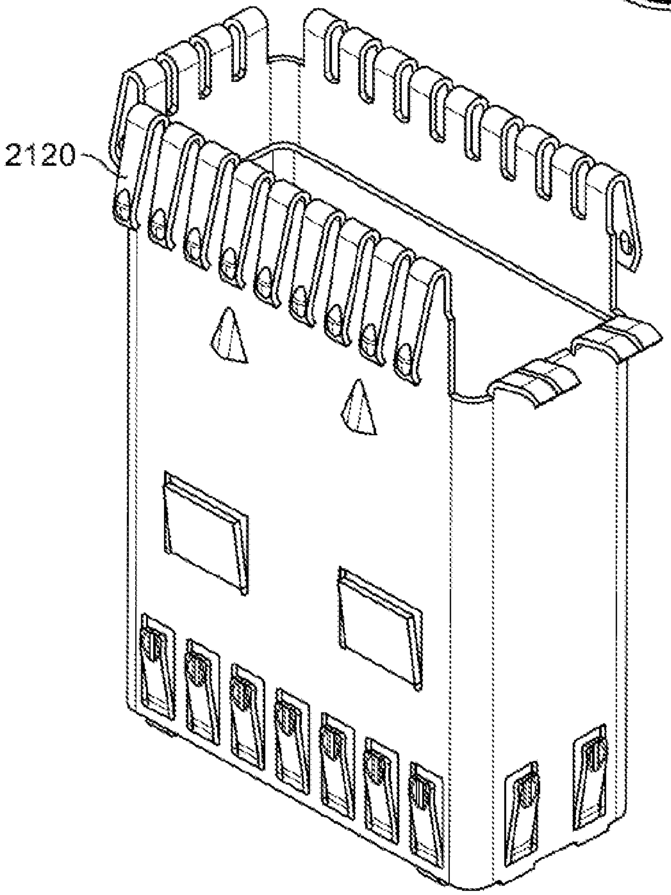
FIG. 32 is a perspective view of a shield contact element with a gap according to the prior art.

Contacting with this contact lamella in the recess allows the current path to be shortened. Additionally, the arrangement allows that an extended current path, for example via a U-turn of the contact lamella, is prevented. Thus, shielding capability is improved because holes between contact lamellae, such as shown in FIG. 29, are avoided. Further, the recess allows the gap between the housing shell 110 and the shield 210 to be reduced, such as discussed above with respect to FIG. 32. This further improves the shielding capability.

Figure 6:
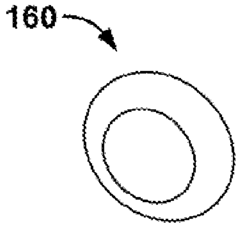
FIG. 6 is a detailed view of element VI of the shield contact element from FIG. 2.
Figure 7:
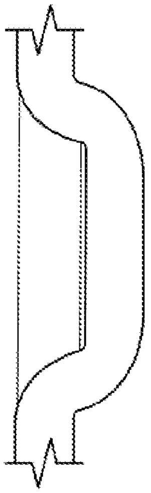
FIG. 7 is a sectional view of FIG. 6.
Figure 8:
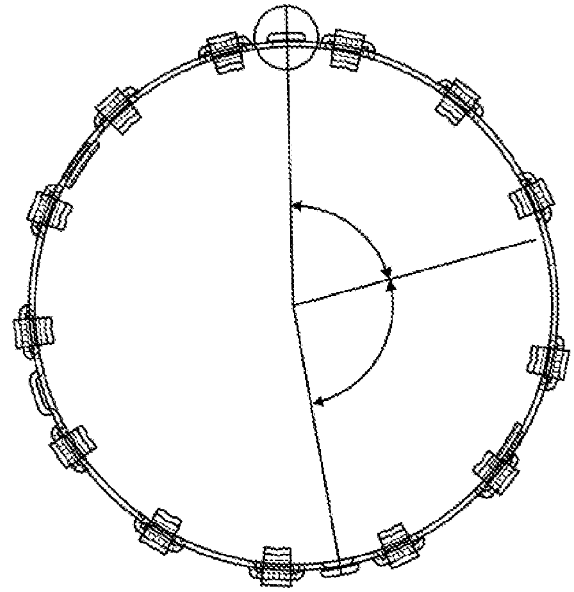
FIG. 8 is a top view of the shield contact element according to FIG. 2 and details.

Further, FIG. 2 shows that the housing shell 110 may include a fastening protrusion 160. The fastening protrusion 160 is described in FIGS. 6 to 8. FIG. 6 shows that the fastening protrusion 160 protrudes outwardly from the housing shell 110. Thus, it can brace with a shield contact housing. FIG. 7 shows a sectional view of the fastening protrusion. FIG. 8 shows that two opposing fastening protrusions 160 can be provided. Here, for example, the angle between the fastening protrusions is 170°. Thus, the fastening protrusions 160 can brace themselves particularly well with the shield contact housing. The shield contact housing thus presses against the opposite fastening protrusions 160, fixing the shield contact housing and shield contact element in position relative to each other.

Further, the housing shell 110 of the shield contact element may include two opposing fastening protrusions 160. These fastening protrusions 160 are formed from the housing shell 110. Like the recess described above, the fastening protrusions are hollow bodies open on one side. In other words, the fastener protrusions are formed perpendicular to the axial direction. They have little or no effect on the shielding, since they do not result in a gap in the shield. In other words, the goal is that the fastening protrusions are not open. They are deep-drawn without gaps or torn out of the housing shell on one side without gaps. This avoids gaps in the shielding jacket. Depending on the shielding requirements, however, certain gaps or openings may be permitted.

Figure 9:
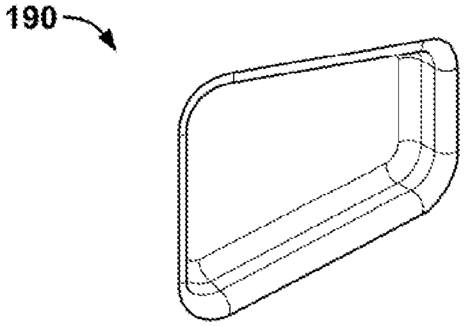
FIG. 9 is a detailed view of element IX of the shield contact element from FIG. 2.
Figure 10:
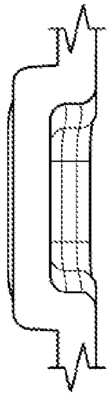
FIG. 10 is a sectional view of FIG. 9.
Figure 11:
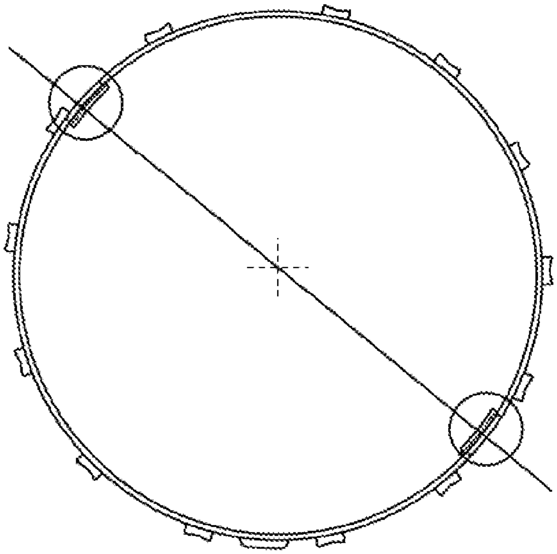
FIG. 11 is a top view of the shield contact element according to FIG. 2 and details.

Further, FIG. 2 shows that the housing shell 110 may include a fastening element 190. The fastening element 190 is described in FIGS. 9 to 11. FIG. 9 shows that the fastening element 190 protrudes inwardly from the housing shell 110. Thus, it can lock the housing of the plug connection. FIG. 10 shows a sectional view of the fastening element. FIG. 11 shows that two opposing fastening elements 190 can be provided. Here, for example, the angle between the fastening elements is 180°.

For example, the plug connection housing includes a groove that cooperates with the fastening element to form a bayonet lock. A bayonet lock is a mechanical connection of two cylindrical parts in their longitudinal axis, i.e. the mating direction, that can be quickly made and released. The parts are connected by inserting them into each other and turning them in opposite directions, and are also separated again in this way. Of course, one outwardly projecting fastener and two opposing inwardly projecting fastener returns may be provided. For the description of these parts, reference is made to the above description.

Like the recess described above, the fastening element 190 is a hollow body open on one side. In other words, the fastening element 190 is formed perpendicular to the axial direction. It does not affect the shielding, or affects it only insignificantly, since it does not lead to any gap in the shield. In other words, the goal is that the fastening element 190 is not open. It is deep-drawn without gap material or torn from the housing shell on one side without a gap. This avoids gaps in the shield cladding. Depending on the shielding requirements, however, certain gaps or openings can be allowed.

Figure 12:
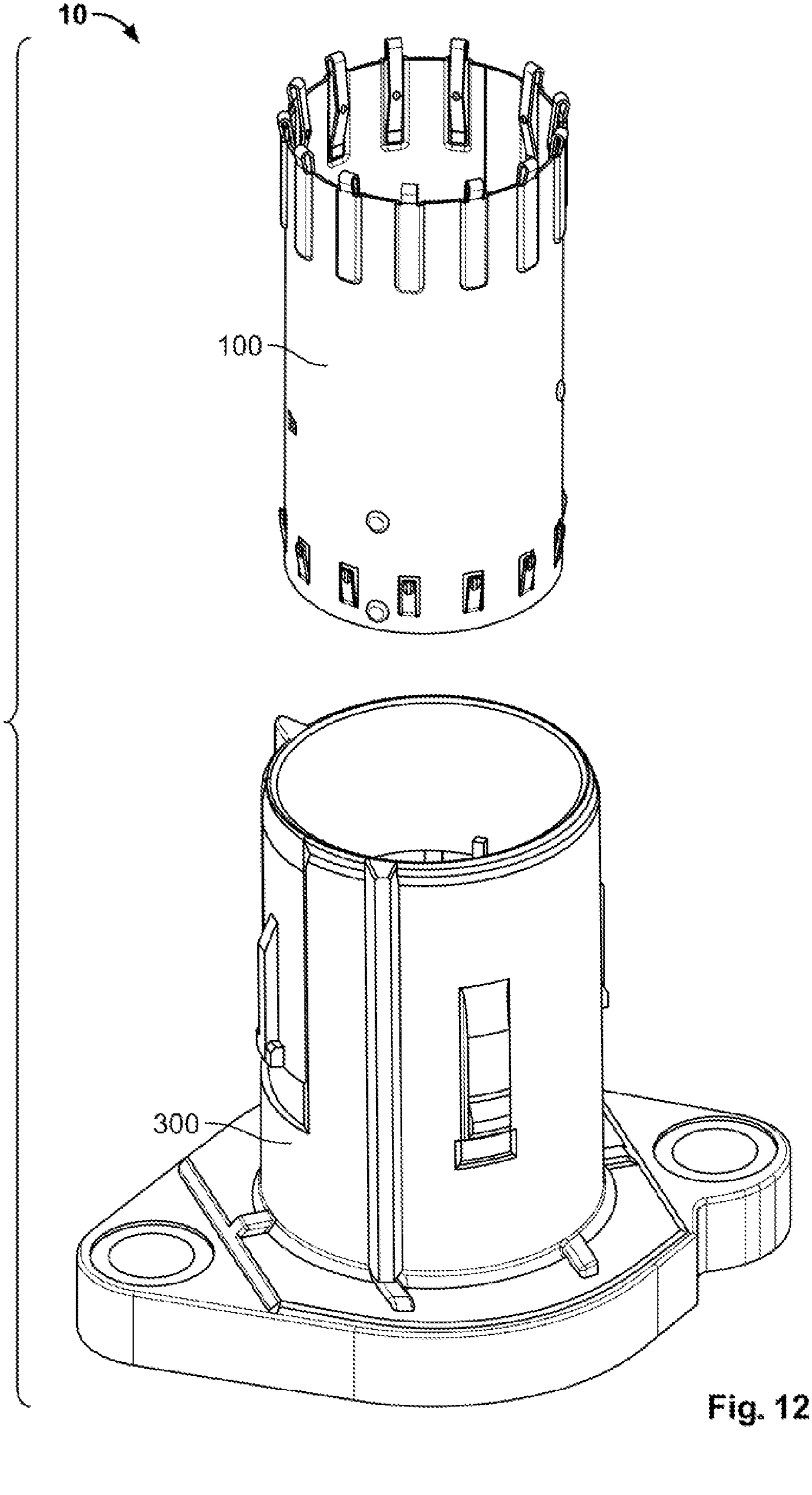
FIG. 12 is another example of a shield contact system before assembly.

FIG. 12 shows an example of a shield contact system 10 prior to assembly. The shield contact system 10 includes a shield contact element 100 received in a shield contact housing 300. For a description of the shield contact element 100 and the shield contact housing 300, reference is made to the above description.

Figure 13:
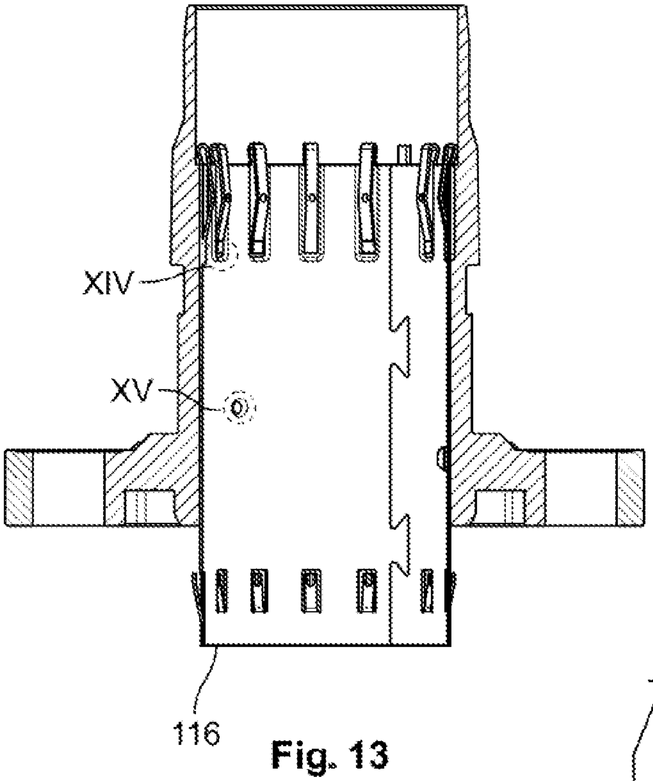
FIG. 13 is a sectional view of the shield contact system from FIG. 12 after assembly.

FIG. 13 shows a section of the shield contact system 10 of FIG. 12 after assembly. In particular, the shield contact housing 300 allows the recesses described above to be provided at only one end of the shield contact element 100. At the end 116, the shield contact element 100 protrudes into a device, for example, so that the recesses described above can be omitted, since the device housing provides the necessary shielding.

Figure 14:
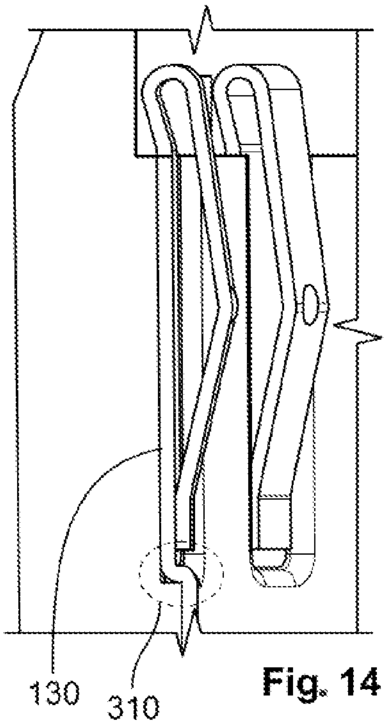
FIG. 14 is a detailed view of element XIV of the shield contact system from FIG. 13.

FIG. 14 shows a detailed view of element XIV of the shield contact system from FIG. 13. In particular, the shield contact housing has a stop 310 on the inside. The stop 310 protrudes perpendicular to the mating direction. Thus, the stop 310 can cooperate with the recess 130 formed in the housing shell so that the axial freedom of movement of the shield contact element 100 in the shield contact housing 300 is restricted.

Figure 15:
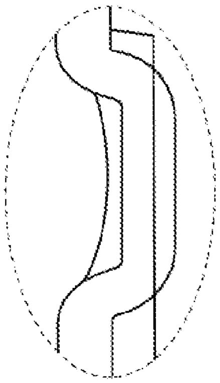
FIG. 15 is a detailed view of element XV of the shield contact system from FIG. 13.

FIG. 15 shows a detailed view of element XV of the shield contact system from FIG. 13. The fastening protrusions can thus brace the shield contact element in the shield contact housing. Furthermore, an opening not shown can be provided in the shield contact housing. Inserting the housing of the plug connection then locks the fastening protrusions in the opening.

Figure 16:
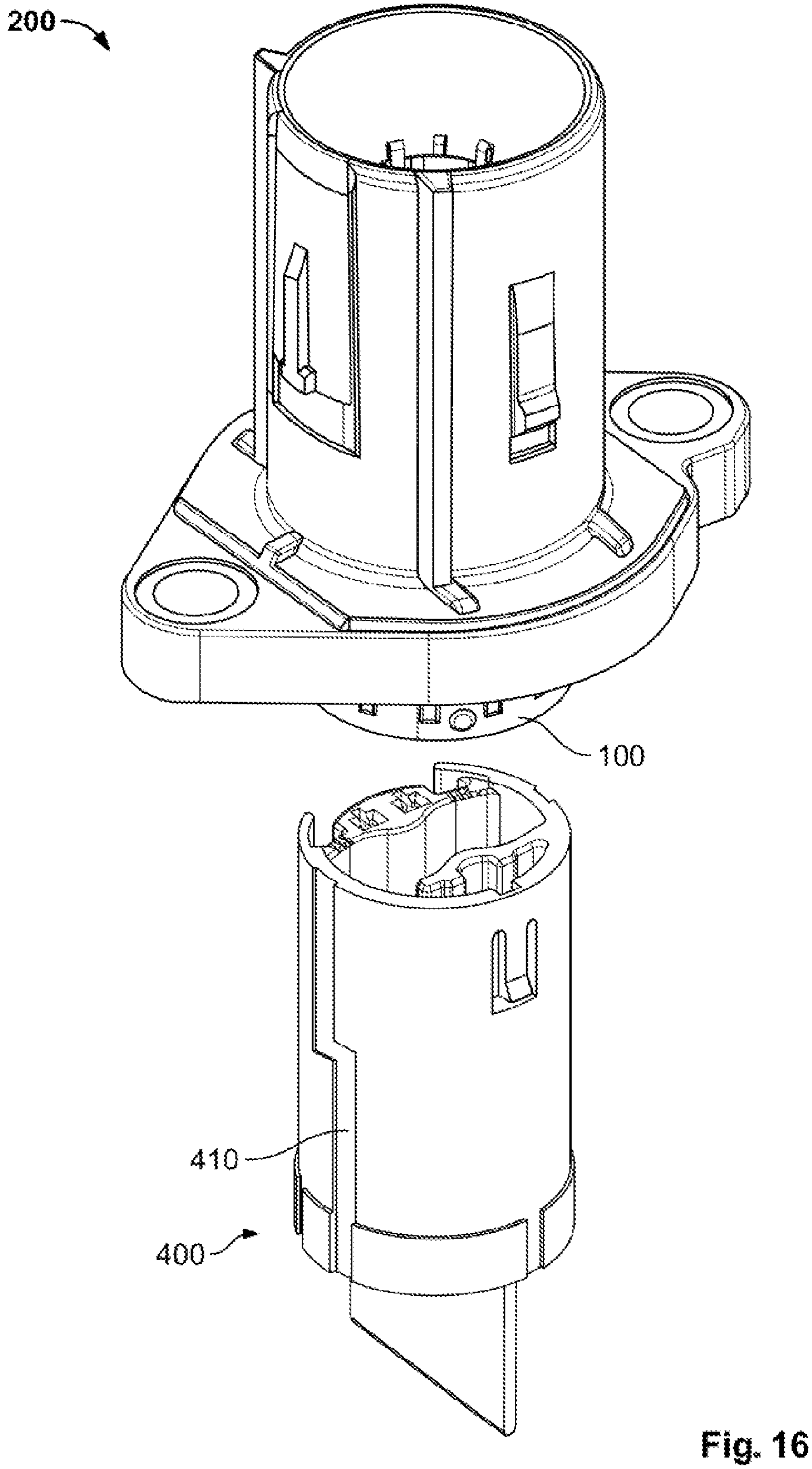
FIG. 16 is a perspective view of another example of a shield contact system before assembly.

FIG. 16 is another example of a shield contact system prior to assembly. The shield contact system 10 includes a shield contact element 100 received in a shield contact housing 300. Further, the shield contact system includes a housing 400 of the plug connection.

Figure 17:
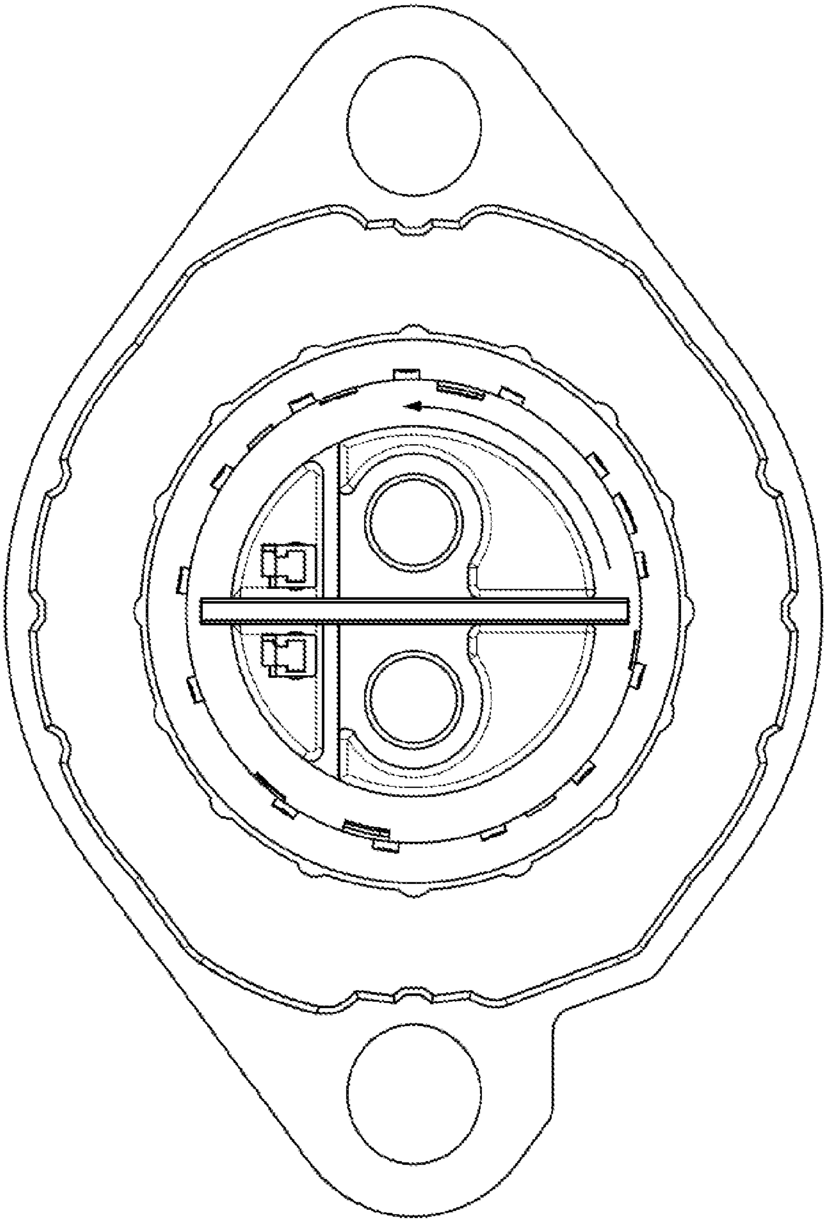
FIG. 17 is a top view of the shield contact system from FIG. 16.
Figure 18:
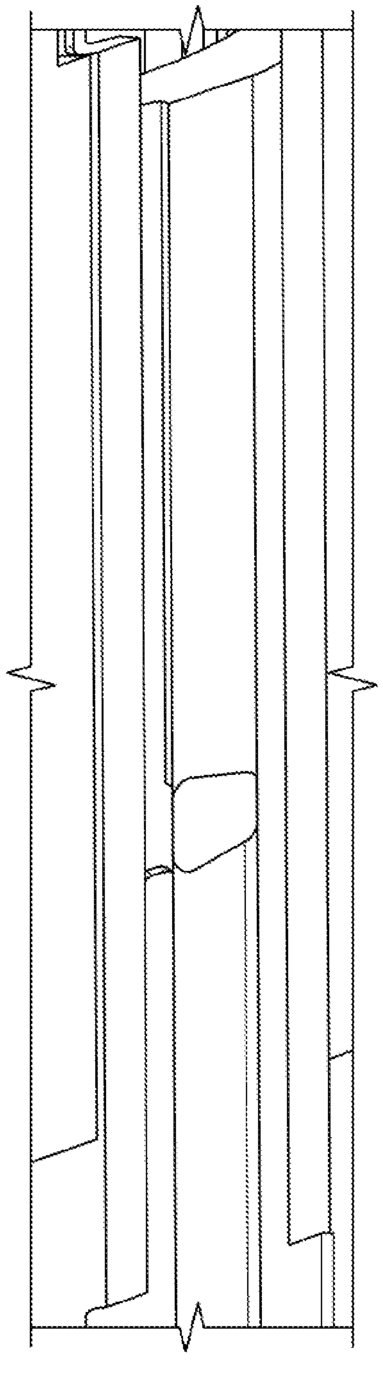
FIG. 18 is a sectional view of the shield contact system from FIG. 16.

For the description of the shield contact element 100 and the shield contact housing 300, reference is made to the above description. Not shown here is that the shield contact system may comprise only the shield contact element 100 and the housing 400 of the plug connection. In particular, the housing 400 of the plug connection includes a groove 410 on the outside of the housing extending from an axial end of the housing 400 in the axial direction and extending in a central portion of the housing perpendicular to the axial direction. Further, FIG. 17 shows a top view of the shield contact system of FIG. 16, and an arrow indicating a direction of rotation to lock the housing 400 in the shield contact element. FIG. 18 is a sectional view of the assembled shield contact system of FIG. 16.

Figure 19:
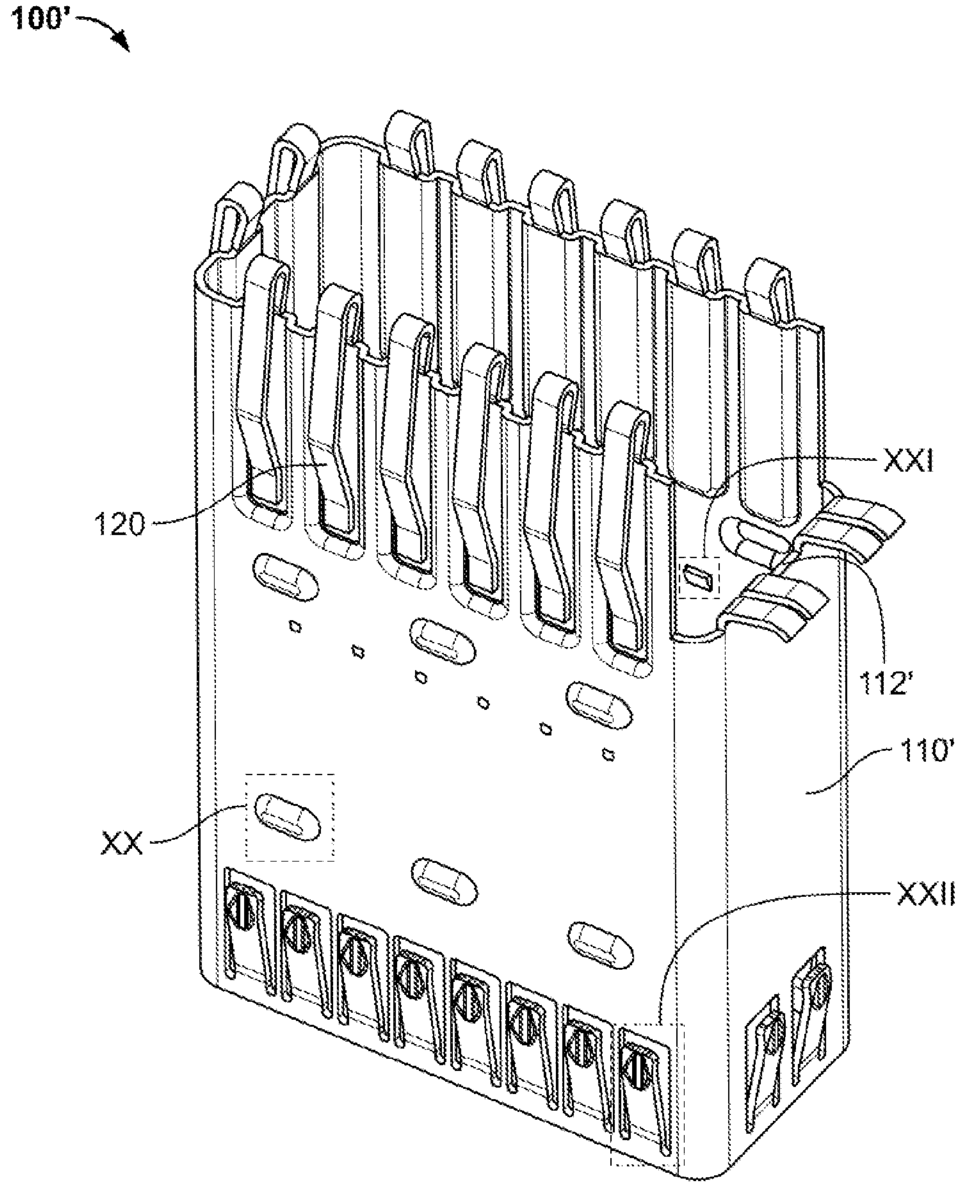
FIG. 19 is a perspective view of another example of a shield contact element.

Another example of a shield contact element 100' is shown in FIG. 19. The shield contact element 100' differs from the shield contact element 100 in that the base of the cylindrical housing shell 110' is rectangular and not round as in FIGS. 1 to 18.

The contact lamella 120 and the elements for connecting the contact lamella 120 to the housing shell 110' are the same or similar. For a description, reference is made to the figures above, in particular to FIG. 5. It can be seen from FIG. 19 that here the recess is open to the outside, whereas the recess in FIGS. 1 to 18 is open to the inside. An alternative direction of the recess is an example not shown in the figures.

Furthermore, FIG. 19 shows that the housing shell 110' has an opening extending in the axial direction from the end 112'. This opening may be provided by external requirement conditions. Shielding can be effected by further parts.

Figure 20:
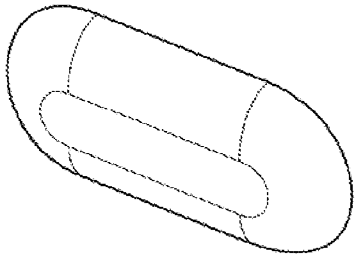
FIG. 20 is a detailed view of element XX of the shield contact element from FIG. 19.

FIG. 20 shows a detailed view of element XX of the shield contact element from FIG. 19. This is a further embodiment of a fastening highlighting, as already described in FIG. 6. Here the shape is elliptical, for example.

Figure 21:
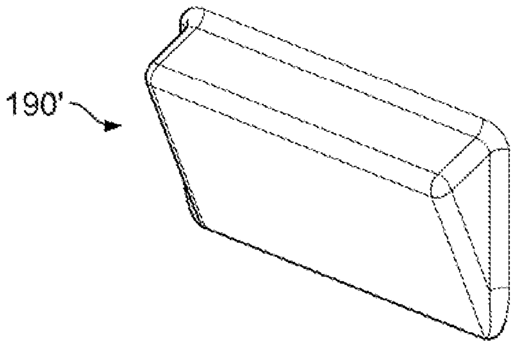
FIG. 21 is a detailed view of element XXI of the shield contact element from FIG. 19.

FIG. 21 shows a detailed view of element XXI of the shield contact element of FIG. 19. This shows a further embodiment of a fastening element, such as described in FIG. 9. Unlike in FIG. 9, the fastening element 190' of FIG. 21 locks by not elastically deforming the housing 400' shown in FIG. 25.

Figure 22:
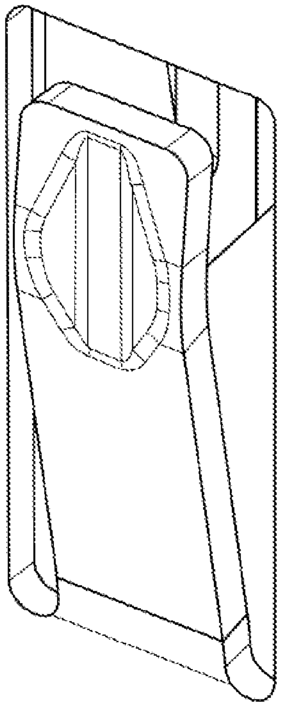
FIG. 22 is a detailed view of element XXII of the shield contact element from FIG. 19.

FIG. 22 is a detailed view of element XXII of the shield contact element of FIGS. 2 and 19. This is an example of a contact part for fixing the shield contact elements 100, 110' in a housing, for example, as discussed above with respect to FIG. 13. In particular, gaps may be provided here as the housing provides the necessary shielding.

Figure 23:
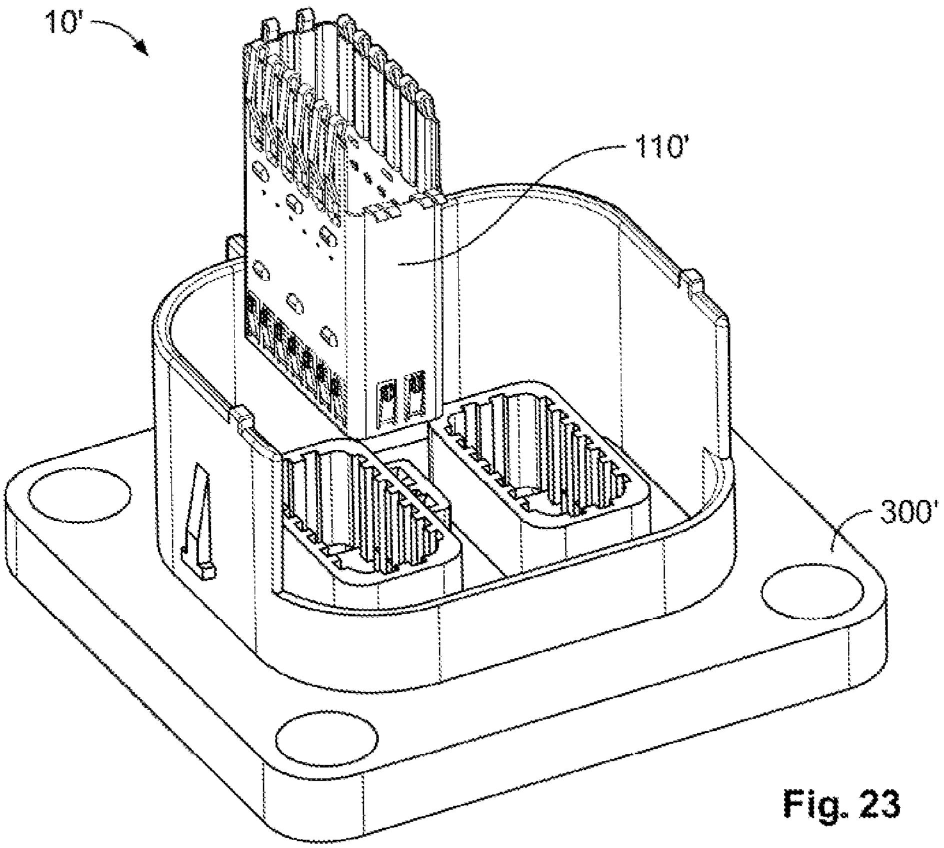
FIG. 23 is a perspective view of another example of another shield contact system before assembly.

FIG. 23 shows another example of a shield contact system 10' before assembly. The shield contact system 10' includes a shield contact element 100' received in a shield contact housing 300'. For a description of the shield contact element 100', reference is made to the above description. For the description of the shield contact housing 300', reference is made to the above description of the shield contact housing 300.

Figure 24:
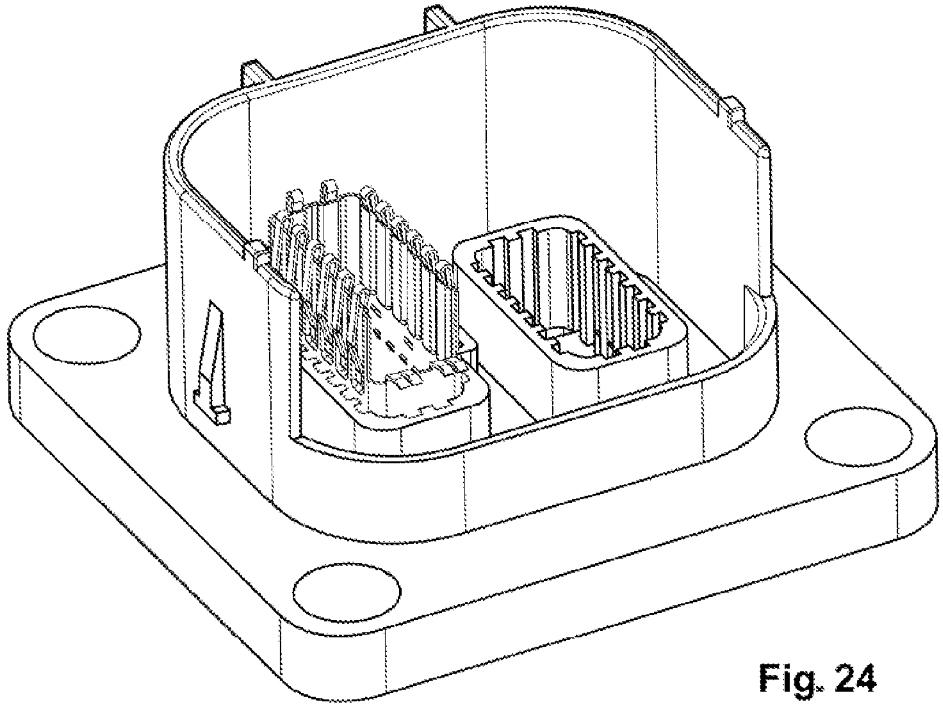
FIG. 24 is another perspective view during assembly of the shield contact system from FIG. 23.

FIG. 24 shows another view during assembly of the shield contact system 10' of FIG. 23.

Figure 25:
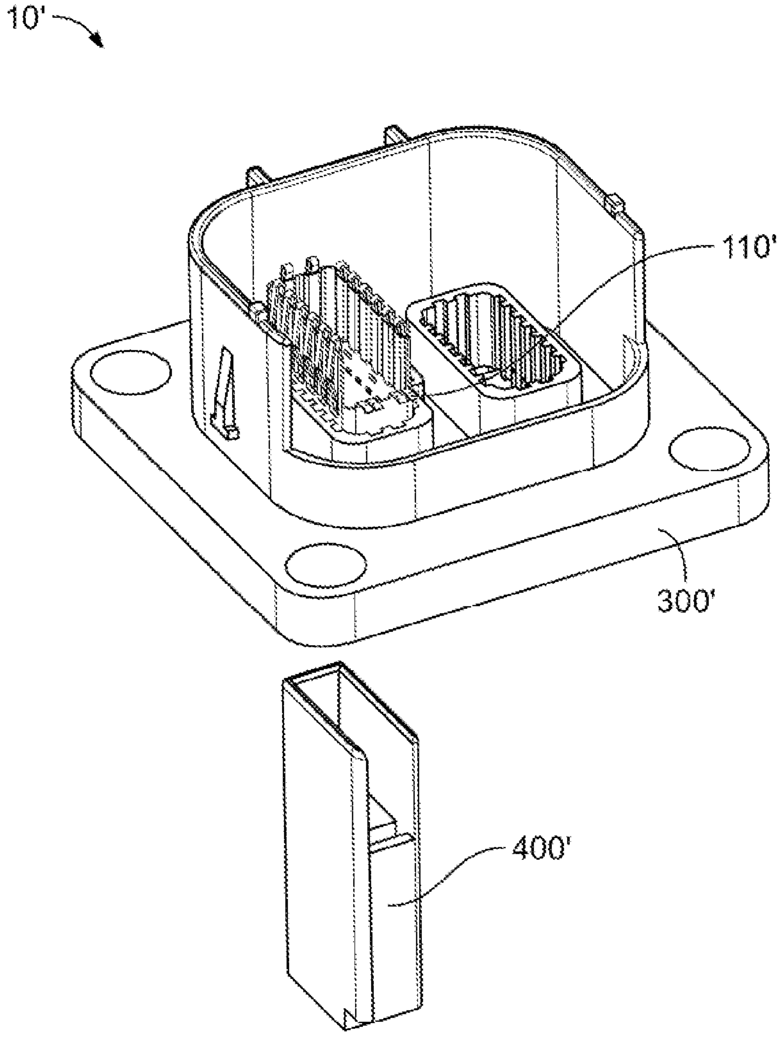
FIG. 25 is another perspective view during assembly of the shield contact system from FIG. 23.

FIG. 25 is another example of a shield contact system 10' prior to assembly. The shield contact system 10' includes a shield contact element 100' received in a shield contact housing 300'. Further, the shield contact system includes a housing 400' of the plug connection.

For the description of the shield contact element 100' and the shield contact housing 300', reference is made to the above description. Not shown here is that the shield contact system can comprise only the shield contact element 100' and the housing 400' of the plug connection.

In particular, the housing 400' is cylindrical with a rectangular base and the shield contact housing 300' has a cylindrical opening with a rectangular base. Thus, with such a non-rotationally symmetrical geometry, twisting of the parts is not possible.

Figure 26:
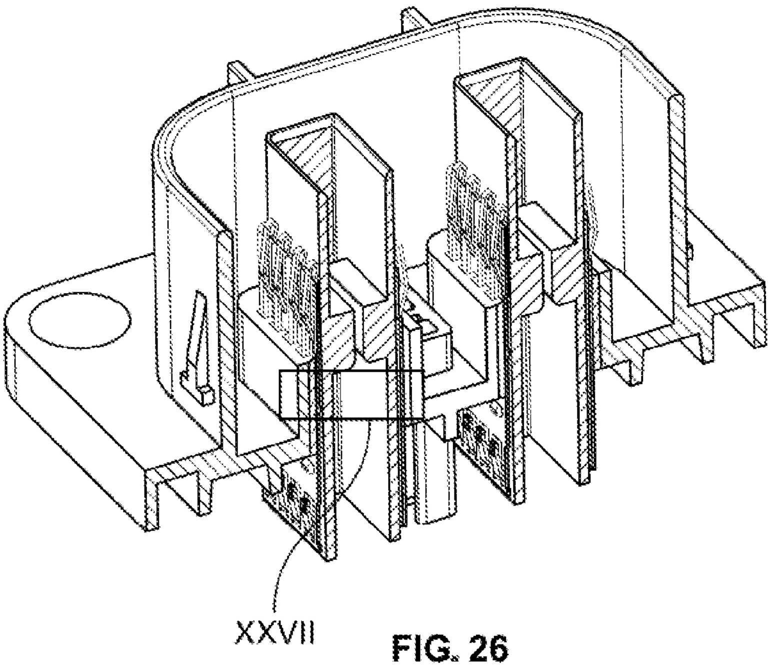
FIG. 26 is a sectional perspective view after assembling the shield contact system from FIG. 25.

FIG. 26 is a sectional view after assembling the shield contact system of FIG. 25.

Figure 27:
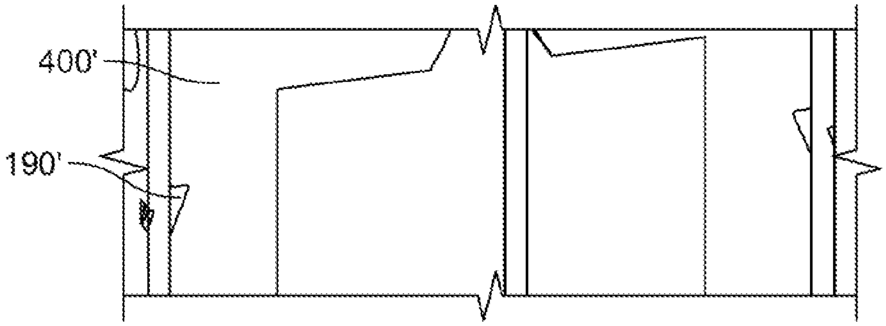
FIG. 27 is a detailed view of element XXVII of the shield contact system from FIG. 26.

FIG. 27 is a detailed view of element XXVII of the shield contact system from FIG. 26. In particular, FIG. 27 shows that the housing 400' is not elastically deformed in the region of the fastening element 190'. Thus, the housing 400' and the shield contact element 100' are inseparably connected.

Figure 28:
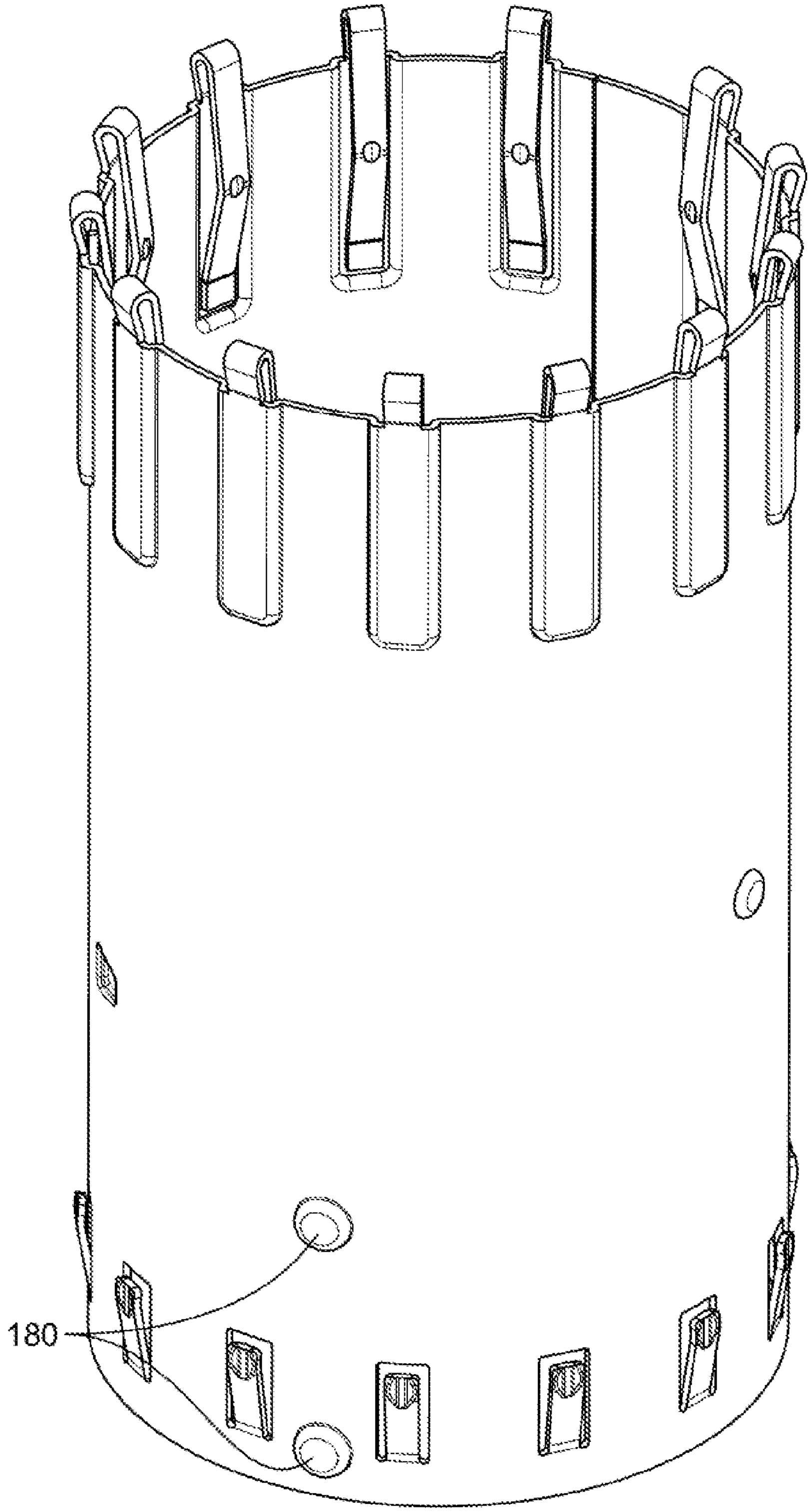
FIG. 28 is a perspective view of another example of a shield contact element.

In accordance with another example, as shown in FIG. 28, orientation protrusions 180 may be provided at an axial end of the housing shell. The orientation protrusions 180 are shaped similar to the fastening protrusions described above. The difference is that a plurality of orientation protrusions 180 are provided along the axial direction. They are formed in the same manner as the fastening member, and reference is made to the above description. It is not shown that the orientation protrusion may be formed by an element extending in the axial direction.

Although not shown in the figures, the housing shell 110, 110' may be formed by bending a sheet of metal into a cylindrical housing shell extending in the axial direction for receiving a plug connector.

Even if not shown in the figures, at least one contact lamella or all contact lamellae can be produced by stamping.

Although not shown in the figures, at least the recess, fastening protrusion, fastening element or orientation protrusions may be formed by deep drawing. In other words, the housing shell is continuous in these areas.

Furthermore, the present invention relates to a method for manufacturing a shield contact element for shielding a plug connection. In particular, the method serves for manufacturing a shield contact element as described above.

The procedure includes the steps:

providing a sheet metal, forming at least one recess in the sheet, bending the sheet metal into a cylindrical housing shell extending in the axial direction for receiving a plug connector, the plug connector for connecting to a plug contact element to form the plug connection, in particular the housing shell is used for contacting a customer unit on one side and for receiving a plug connector, for example a high-voltage plug connector, on the other side, providing at least one ion axial direction extending contact lamella for creating an electrical connection between the housing shell and a shield for shielding the plug contact element, wherein a contact foot of the contact lamella is disposed in the recess formed in the housing shell to contact the housing shell with the shield in the recess.

In particular, a sheet is a rolled metal product that is delivered as a sheet and whose width and length are much greater than its thickness. Any material, especially metal, used for shielding may be understood herein as sheet.

Thus, a shield contact element, which has been described above, for example, can be produced particularly easily. For the further features, reference is made to the above description.

The method may further comprise the step of:

punching the at least one contact lamella from the provided sheet metal and wherein by bending the sheet a U-shaped connector is created between the housing shell and the contact lamella so that the contact foot is arranged in the recess.

Thus, as already described above, a one-piece shield contact element can be produced particularly easily.

The method may additionally or alternatively comprise the step of deep drawing. The deep drawing step may form at least one of the following elements in the sheet:

the deepening;

the two fastening protrusions formed from the housing shell, the fastening protrusion protruding in particular outwardly from the housing shell after bending and facing each other, in particular to brace a shield contact housing; and a fastening element formed from the housing shell, the fastening element protruding in particular inwardly from the housing shell after bending, in particular to lock a housing of the plug connection.

The method may further comprise steps of assembling with at least one of the shield contact housing and the housing of the plug connection to create a shield contact system.

What is claimed is:

1. A shield contact element for shielding a plug connection, comprising:

a housing shell having a cylindrical shape and extending in an axial direction for receiving a plug connector, the plug connector connecting to a plug contact element to form the plug connection; and a contact lamella extending in the axial direction and creating an electrical connection between the housing shell and a shield for shielding the plug contact element, the contact lamella has a contact foot disposed in a recess formed in the housing shell to electrically contact the housing shell with the shield in the recess, the recess formed into the housing shell in a first direction transverse to the axial direction and open on one side in a second direction opposite the first direction.

2. The shield contact element of claim 1, wherein the recess extends from one axial end of the housing shell in the axial direction to another end of the housing shell.

3. The shield contact element of claim 1, wherein the contact foot is a first contact foot having a free end abuttingly contacting a surface of the housing shell facing in the second direction through the open one side of the recess, and the contact lamella has a second contact foot projecting from the housing shell in the second direction opposite to the first direction of the recess.

4. The shield contact element of claim 3, wherein the second contact foot connects to the shield by form fitting.

5. The shield contact element of claim 4, wherein the contact lamella has a third contact foot, the first contact foot and the third contact foot are arranged in the recess and the second contact foot presses against the shield.

6. The shield contact element of claim 5, wherein the second contact foot is arranged in the axial direction between the first contact foot and the third contact foot.

7. The shield contact element of claim 1, wherein the contact lamella is one of a plurality of contact lamella, a spacing is provided between adjacent contact lamella of the plurality of contact lamella.

8. The shield contact element of claim 7, wherein the plurality of contact lamella are manufactured by stamping so that an area between the plurality of contact lamella is sheared off.

9. The shield contact element of claim 1, wherein the housing shell has a pair of fastening protrusions opposing one another and formed from the housing shell, the fastening protrusions project outwardly from the housing shell and brace a shield contact housing.

10. The shield contact element of claim 1, wherein the housing shell has a fastening element formed from the housing shell, the fastening element protrudes from the housing shell inwardly to lock a housing of the plug connection.

11. The shield contact element of claim 3, further comprising a U-shaped connector having a pair of legs fixing the contact lamella to the housing shell and shortening a current path, each leg of the pair of legs connected to a respective side of the U-shaped connector.

12. The shield contact element of claim 11, wherein the first contact foot is arranged in the recess by bending the U-shaped connector.

13. The shield contact element of claim 12, wherein a first one of the legs of the U-shaped connector and the housing shell are connected via the recess.

14. The shield contact element of claim 12, wherein a second one of the legs of the U-shaped connector is fixed to an axial end of the housing shell.

15. The shield contact element of claim 14, further comprising an offset piece disposed between the second one of the legs of the U-shaped connector and the housing shell to offset the U-shaped connector in the first direction of the recess.

16. The shield contact element of claim 15, wherein the U-shaped connector, the offset piece, the contact lamella, and the housing shell are a one-part piece.

17. A shield contact system, comprising:

a shield contact housing formed from an insulative material and have a stop on an inside; and a shield contact element received in an interior of the shield contact housing, the shield contact element including a housing shell having a cylindrical shape and extending in an axial direction for receiving a plug connector, the plug connector connecting to a plug contact element to form the plug connection, and a contact lamella extending in the axial direction and creating an electrical connection between the housing shell and a shield for shielding the plug contact element, the contact lamella has a first contact foot disposed in a recess formed in the housing shell to electrically contact the housing shell with the shield in the recess, the recess and the stop directly contacting the shield contact element to restrict an axial freedom of movement of the shield contact element in the shield contact housing.

18. The shield contact system of claim 17, wherein:

the recess defines a hollow body open on one side facing a first direction transverse to the axial direction and closed on an opposite side, the first contact foot having a free end contacting a surface of the housing shell facing in the first direction through the open one side of the recess; and the shield contact element further includes:

a U-shaped connector having a pair of legs, each leg extending from a respective opposite side of the U-shaped connector;

a second contact foot extending from a first one of the legs of the contact lamella and projecting from the housing shell in the first direction; and an offset piece disposed between a second one of the legs of the U-shaped connector and the housing shell to offset the U-shaped connector in a direction of the recess opposite the first direction.

19. A method for manufacturing a shield contact element for shielding a plug connection, comprising:

providing a sheet metal;

forming a recess in the sheet metal, the recess open on one side and closed on an opposite side;

bending the sheet metal into a housing shell formed in a cylindrical shape and extending in axial direction for receiving a plug connector, the plug connector connecting to a plug contact element to form the plug connection; and providing a contact lamella extending in the axial direction and creating an electrical connection between the housing shell and a shield for shielding the plug contact element, a contact foot of the contact lamella is disposed in the recess formed in the housing shell to contact the housing shell with the shield in the recess on a side of the housing shell facing the open one side of the recess.

20. The method of claim 19, further comprising:

punching off the contact lamella from the sheet metal and, by bending the sheet, a U-shaped connector is created between the housing shell and the contact lamella; and deep drawing to form the recess.

* * * * *